2,983,716
RUBBER VULCANIZATION ACCELERATION

Ellis K. Fields, Chicago, Ill., assignor to Standard Oil Company, Chicago, Ill., a corporation of Indiana No Drawing. Filed Mar. 26, 1958, Ser. No. 723,986

12 Claims. (Cl. 260—79.5)

This invention pertains to the vulcanization of rubber, and more particularly relates to improved vulcanization accelerators.

An object of the present invention is to provide a new and effective class of rubber vulcanization accelerators, which produce vulcanizates having improved aging properties.

I have found that effective rubber vulcanization accelerators are aromatic polysulfide derivatives of 2,5-dimercapto-1,3,4-thiadiazole having the general formula

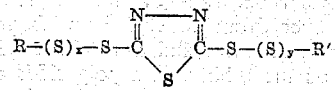

in which R is an aryl radical, R' is the hydrogen or an aryl radical which may be the same as R or a different aryl radical, $x$ and $y$ are numbers 0 to about 8, the sum of $x$ and $y$ being at least 1 and preferably 2 to about 16. The aryl radicals can be mono- or poly-nuclear and can have substituent groups such as hydrocarbon groups, halo, sulfo, etc. on the ring carbon atoms. Examples of such suitable aromatic radicals are phenyl, tolyl, benzyl, styryl, naphthyl, anthracyl, etc.

The polysulfide derivatives of 2,5-dimercapto-1,3,4-thiadiazole can be suitably prepared by several methods. For example, they can be prepared by reacting the thiadiazole with a suitable aryl sulfenyl halide in a 1:1 molar proportion at −10° C. to 215° C. for 1 to 6 hours in the presence of a solvent such as chloroform or carbon tetrachloride. Preferably, however, I prefer to prepare the polysulfides by reacting the 2,5-dimercapto-1,3,4-thiadiazole with an aromatic mercaptan and sulfur in the molar proportions of 1:1:1 to 1:2:4 respectively at 100–150° C. for 1 to 6 hours. If desired, a solvent such as Cellosolve or xylene can be used. Bis-trisulfide derivatives are obtained by reacting the 2,5-dimercapto-1,3,4-thiadiazole with an aryl mercaptan and a sulfur chloride in molar ratios of from 1:2:2 to 1:2:4 respectively at a temperature of 50–100° C. Higher polysulfides can be prepared by reacting the thiadiazole di- or trisulfides with sulfur at temperatures of 200–400° F.

The preparation of the polysulfide derivatives of 2,5-mercapto-1,3,4-thiadiazole is illustrated by the following examples:

EXAMPLE I

The vapor from 4.59 ml. (7.09 grams, 0.1 mole) chlorine was passed into a solution of 10.26 ml. (11.02 grams, 0.1 mole) thiophenol in 100 ml. carbon tetrachloride stirred at −5° C. After all the chlorine was in, the mixture was stirred for 15 minutes at 0° C., then treated portionwise with 15 grams (0.1 mole) 2,5-dimercapto-1,3,4-thiadiazole over 30 minutes, maintaining the temperature at −5° C. to −0° C. The mixture was then allowed to warm to room temperature, and finally stirred at 45° C. with $N_2$ blowing for 2 hours. Evaporation of the solvent on a steam bath gave a yellow solid which crystallized from benzene and melted at 140.5–141° C.

The yield was 16.6 grams (64%). Analysis.—Calculated for $C_8H_6N_2S_4$: N, 10.85; S, 49.60; mol. wt., 258. Found: N, 10.62; S, 49.50; mol. wt., 268.

EXAMPLE II

A mixture of 41 ml. (44 grams, 0.4 mole) thiophenol, 30 grams (0.2 mole) 2,5-dimercapto-1,3,4-thiadiazole, 12.8 grams (0.4 gram atom) sulfur, and 60 ml. xylene was stirred at 125° C. for 4 hours, cooled, the light yellow solid collected on a filter and crystallized from benzene. There resulted 52 grams solid melting at 124–128° C. and containing 12.13% N and 42.3% sulfur.

EXAMPLE III

A mixture of 109 grams fuel oil thiocresols (obtained by springing alkaline wash from fuel oils with HCl and distilling, b.p. 85–110°/3.2, 11.12% sulfur), 30 grams (0.2 mole) 2,5-dimercapto-1,3,4-thiadiazole and 12.8 grams (0.4 gram atom) sulfur was stirred at 130–135° C. for 2 hours. Hydrogen sulfide evolved and the 2,5-dimercapto-1,3,4-thiadiazole went into solution. The product was cooled and filtered, giving 129 grams viscous yellow product containing 3.47% N and 26.0% sulfur.

EXAMPLE IV

A mixture of 128 grams of a ring-alkylated thiophenol, 30 grams (0.2 mole) 2,5-dimercapto-1,3,4-thiadiazole and 12.8 grams (0.4 gram atom) sulfur was stirred for 3 hours at 130–135° C. and filtered. The filtrate, 147 grams, was a viscous yellow product containing 3.30% N and 23.4% sulfur.

The ring-alkylated thiophenol, a product marketed by Alrose Chemical Company as "Alrothiol" is a colorless liquid having a boiling point of 135–165° C./1 mm.; a freezing point of −40° C., a specific gravity 0.9470 and a molecular weight of 320.

The vulcanization accelerators of the present invention can be used singly or in admixtures with each other, to vulcanize natural rubber, synthetic rubbers and other vulcanizable organic materials such as balata, gutta percha and the like, which are susceptible to vulcanization when heated with from 1% to about 5% sulfur. The accelerators of this invention used in amounts of from about 0.1% to about 3%, based on the rubber in the composition, can be employed together with other materials such as antioxidants, retarders, softeners, fillers, etc.

To demonstrate the effectiveness of the herein described vulcanization accelerators, a GR–S rubber (a butadiene-styrene copolymer) was blended in a standard formula as follows:

| | Parts by weight |
|---|---|
| GR–S | 100 |
| Philblack O (carbon) | 50 |
| Zinc oxide | 5 |
| Stearic acid | 2 |
| Sulfur | 1.75 |
| Antioxidant ("Betanox Special")[1] | 1 |

[1] A ketone-amine condensation product marketed by Naugatuck Chemical.

To the above formulation was added 1.75 parts of the 2,5-dimercapto-1,3,4-thiadiazole polysulfide of Example II; this formulation is identified as Formula No. 1 in the tabulation below. For comparison, to the same basic formula, in place of the accelerator of the present invention was added 1.75 parts 2,2'-dithiobisbenzothiazole (Formula 2), 2-mercaptobenzothiazole (Formula 3), and N-cyclohexyl-2-benzothiazole-sulfenamide (Formula 4). The later three compounds are commercial vulcanization accelerators in common use at present.

The four formulations were cured at 316° F. for 5, 10, 15, 25, 30 and 40 minutes and the physical properties of the vulcanizates determined. The vulcanizates were then aged in an oven at 212° F. for 70 hours and the physical properties thereof again determined.

The data obtained are tabulated in Table I.

Table 1

| Formula No. | Cure at 316° F., Minutes | Mod. 200 + | Tens., p.s.i. | Percent Elong. | Hard. | Lbs. Tear. |
|---|---|---|---|---|---|---|
| 1 | 5 | 316 | 2,000 | 760 | 55 | 430 |
|   | 10 | 492 | 2,810 | 665 | 57 | 457 |
|   | 15 | 560 | 3,145 | 615 | 60 | 370 |
|   | 25 | 735 | 3,175 | 485 | 62 | 363 |
|   | 30 | 840 | 3,320 | 515 | 65 | 360 |
|   | 40 | 850 | 3,410 | 510 | 65 | 264 |
| 2 | 5 | 153 | 1,260 | 925 | 54 | 317 |
|   | 10 | 320 | 3,155 | 715 | 55 | 423 |
|   | 15 | 497 | 3,265 | 515 | 57 | 321 |
|   | 25 | 715 | 3,305 | 480 | 60 | 312 |
|   | 30 | 790 | 3,390 | 470 | 60 | 305 |
|   | 40 | 830 | 2,950 | 400 | 62 | 305 |
| 3 | 5 | 161 | 1,255 | 900 | 54 | 310 |
|   | 10 | 400 | 2,820 | 610 | 58 | 435 |
|   | 15 | 555 | 3,090 | 520 | 59 | 333 |
|   | 25 | 820 | 3,100 | 440 | 60 | 322 |
|   | 30 | 850 | 3,100 | 430 | 62 | 310 |
|   | 40 | 890 | 3,100 | 425 | 62 | 287 |
| 4 | 5 | 247 | 1,720 | 710 | 55 | 388 |
|   | 10 | 800 | 3,075 | 450 | 61 | 252 |
|   | 15 | 870 | 3,185 | 405 | 63 | 245 |
|   | 25 | 945 | 3,190 | 390 | 63 | 242 |
|   | 30 | 1,005 | 3,280 | 380 | 64 | 246 |
|   | 40 | 1,005 | 3,360 | 440 | 65 | 255 |

OVEN AGED 70 HOURS AT 12° F.

| | | | | | | |
|---|---|---|---|---|---|---|
| 1 | 5 | 1,430 | 2,190 | 280 | 65 | 374 |
|   | 10 | 1,700 | 2,850 | 300 | 68 | 278 |
|   | 15 | 1,935 | 2,855 | 245 | 68 | 262 |
|   | 25 | 2,030 | 2,865 | 260 | 70 | 228 |
|   | 30 | 2,125 | 2,790 | 245 | 70 | 223 |
|   | 40 | 2,125 | 2,735 | 245 | 70 | 220 |
| 2 | 5 | 700 | 1,800 | 380 | 60 | 452 |
|   | 10 | 1,430 | 1,825 | 235 | 65 | 260 |
|   | 15 | 1,505 | 2,020 | 240 | 65 | 241 |
|   | 25 | 1,550 | 2,450 | 245 | 67 | 212 |
|   | 30 | 1,550 | 2,910 | 260 | 67 | 208 |
|   | 40 | 1,645 | 2,550 | 260 | 68 | 208 |
| 3 | 5 | 935 | 2,280 | 320 | 63 | 378 |
|   | 10 | 1,680 | 2,295 | 235 | 66 | 253 |
|   | 15 | 1,910 | 2,375 | 220 | 68 | 244 |
|   | 25 | 1,985 | 2,440 | 225 | 69 | 238 |
|   | 30 | 1,840 | 2,300 | 220 | 70 | 204 |
|   | 40 | 1,840 | 2,215 | 225 | 70 | 177 |
| 4 | 5 |  | 1,770 | 170 | 65 | 335 |
|   | 10 |  | 2,240 | 175 | 67 | 303 |
|   | 15 |  | 2,190 | 165 | 68 | 192 |
|   | 25 |  | 2,240 | 175 | 69 | 170 |
|   | 30 | 2,005 | 2,430 | 220 | 69 | 164 |
|   | 40 | 2,385 | 2,700 | 235 | 70 | 160 |

In the table, above, the various column headings have the following meanings:

"Mod. 200%"—The value of the load in pounds per square inch of original cross-section area of sample to give an elongation of 200%.

"Tens. p.s.i."—The pounds per square inch of original cross-section when the test piece of rubber breaks at an elongation of 20 inches per minute speed.

"% Elong."—The percentage of elongation of the test piece at breaking point.

"Hard."—A measure of the hardness of the rubber in resisting the indentation of its surface by a cone.

"Lbs. Tear"—Pounds of force which must be applied to a notched piece of rubber to tear it apart.

The first three tests were conducted on a Scott Testing Machine Model 6 according to ASTM D–412–51T; hardness was measured by a Shore Durameter Type A, according to ASTM D–314–52T; and the tear test was made according to ASTM D–624–48. All of the ASTM tests are fully described in ASTM Standards on Rubber Products.

Percentages given herein and in the appended claims are weight percentages, unless otherwise stated.

I claim:

1. The method which comprises vulcanizing a rubber selected from the class consisting of natural rubber and butadiene-styrene copolymer synthetic rubber in the presence of from 1% to about 5%, based on the rubber, of sulfur, and from about 0.1% to about 3%, based on the rubber, of a polysulfide derivative of 2,5-dimercapto-1,3,4-thiadiazole having the general formula

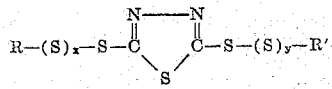

in which R is an aryl radical, R' is selected from the group consisting of hydrogen and an aryl radical, $x$ and $y$ are integers 0 to about 8, the sum of $x$ and $y$ being at least 1.

2. The method of claim 1 in which the rubber is a butadiene-styrene copolymer synthetic rubber.

3. The method of claim 1 in which R and R' are phenyl radicals.

4. The method of claim 1 in which R is a phenyl radical, R' is hydrogen, $x$ is 1 and $y$ is 0.

5. The method of claim 1 in which R and R' are ring-alkylated phenyl radicals.

6. An unvulcanized composition containing a predominant amount of a rubber selected from the class consisting of natural rubber and butadiene-styrene copolymer synthetic rubber, from about 1% to about 5%, based on the rubber, of sulfur and from about 0.1% to about 3%, based on the rubber, of a polysulfide derivative of 2,5-dimercapto-1,3,4-thiadiazole having the general formula

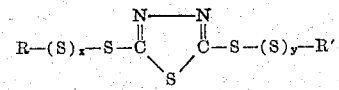

in which R is an aryl radical, R' is selected from the group consisting of hydrogen and an aryl radical, $x$ and $y$ are integers 0 to about 8, the sum of $x$ and $y$ being at least 1.

7. An unvulcanized composition as described in claim 6 in which the rubber is a butadiene-styrene copolymer synthetic rubber.

8. On unvulcanized composition as described in claim 6 in which R is a phenyl radical, R' is hydrogen, $x$ is 1 and $y$ is 0.

9. An unvulcanized composition as described in claim 6 in which R and R' are phenyl radicals.

10. The method of claim 1 in which the rubber is natural rubber.

11. An unvulcanized composition as described in claim 6 in which the rubber is natural rubber.

12. An unvulcanized composition as described in claim 6 in which R and R' are ring alkylated phenyl radicals.

References Cited in the file of this patent

UNITED STATES PATENTS

| 1,583,762 | Sebrell | May 4, 1926 |
| 2,331,749 | Watt | Oct. 12, 1943 |
| 2,719,125 | Roberts | Sept. 27, 1955 |
| 2,719,126 | Fields et al. | Sept. 27, 1955 |
| 2,736,729 | Krzikalla et al. | Feb. 28, 1956 |
| 2,766,223 | Goshorn et al. | Oct. 9, 1956 |

FOREIGN PATENTS

| 541,258 | Canada | May 21, 1957 |
| 750,907 | Great Britain | June 20, 1956 |